May 16, 1944.  L. G. FREEMAN, JR., ET AL  2,348,799
DIE ASSEMBLY
Filed April 18, 1939  11 Sheets-Sheet 2
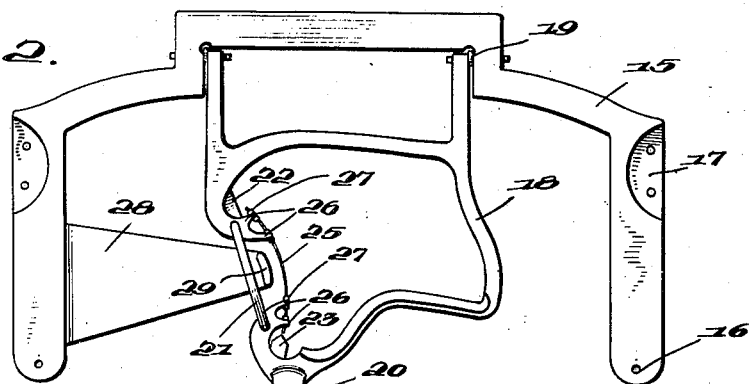
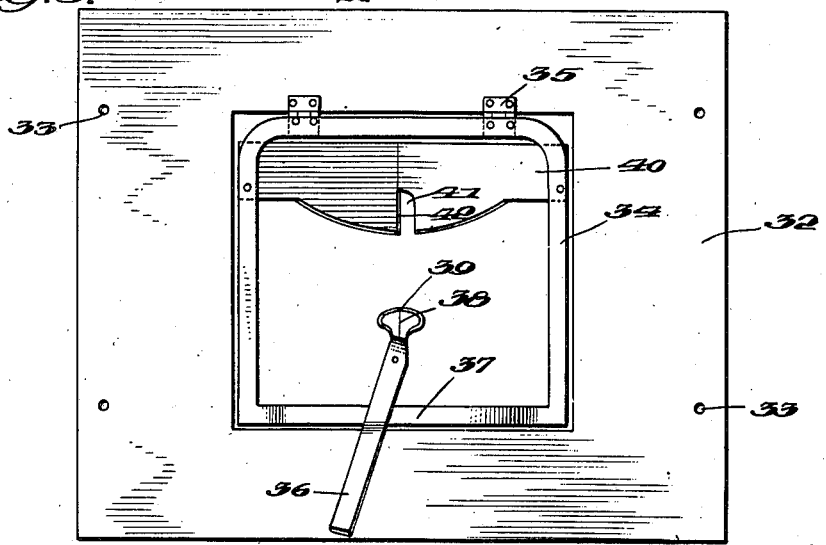
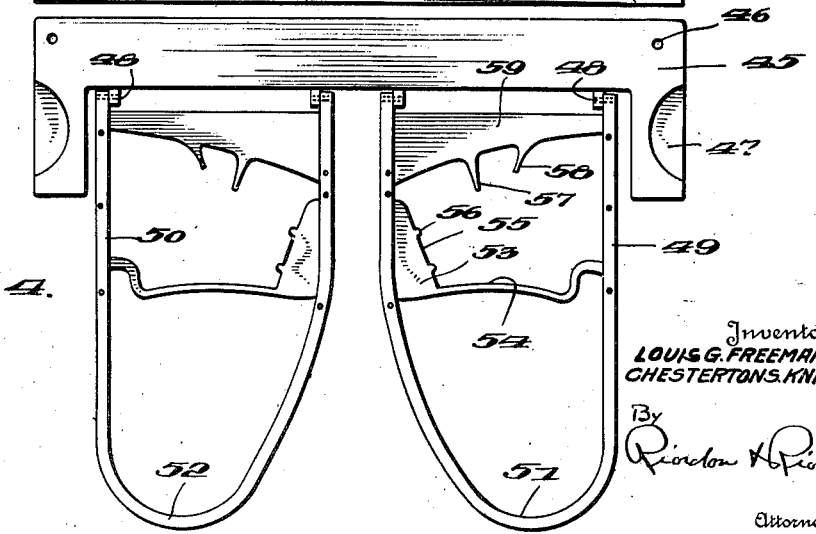
Inventors
LOUIS G. FREEMAN Jr.
CHESTERTON S. KNIGHT,
By
Riordon & Riordon
Attorneys May 16, 1944. L. G. FREEMAN, JR., ET AL 2,348,799
DIE ASSEMBLY
Filed April 18, 1939 11 Sheets-Sheet 3
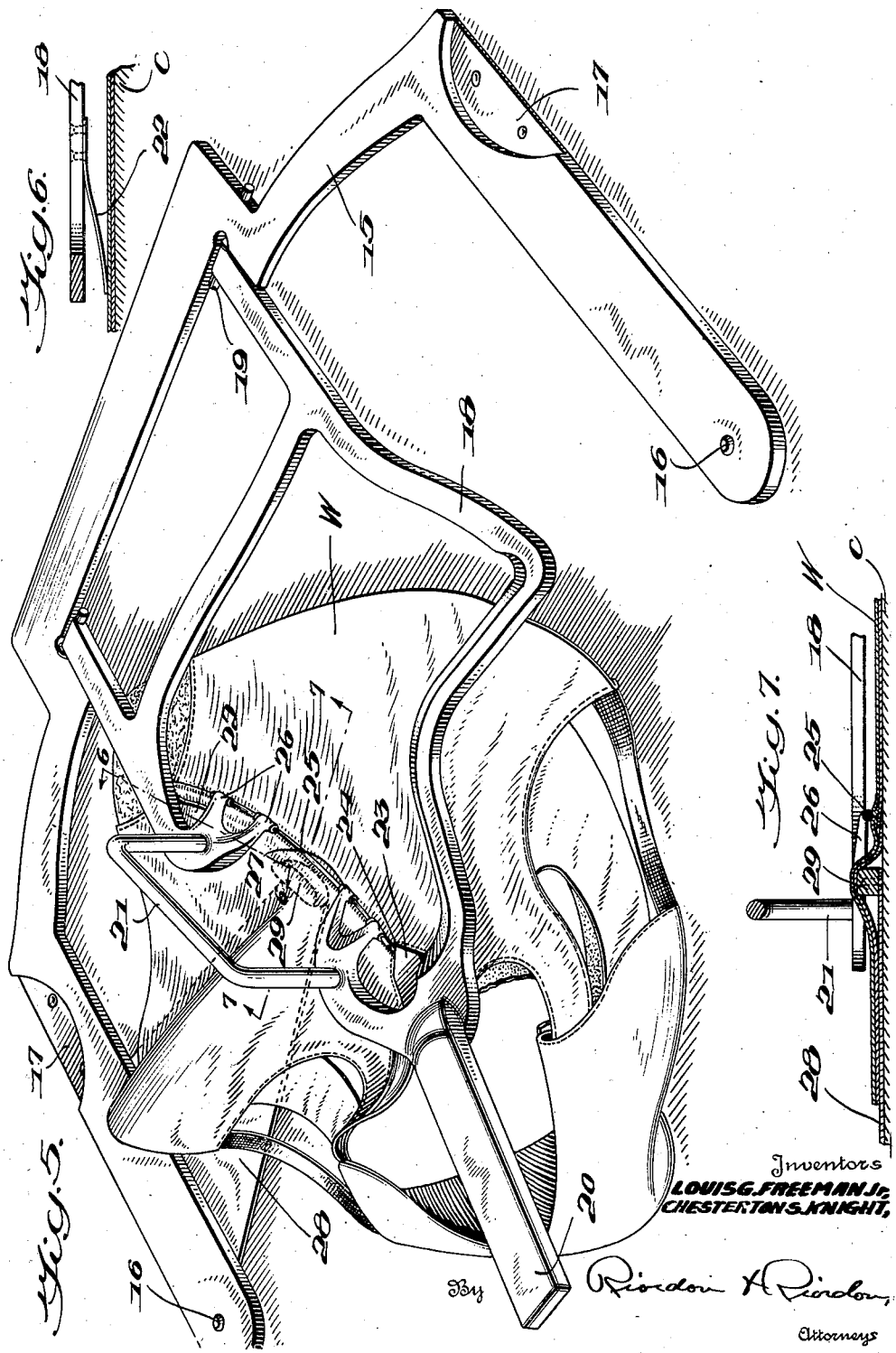

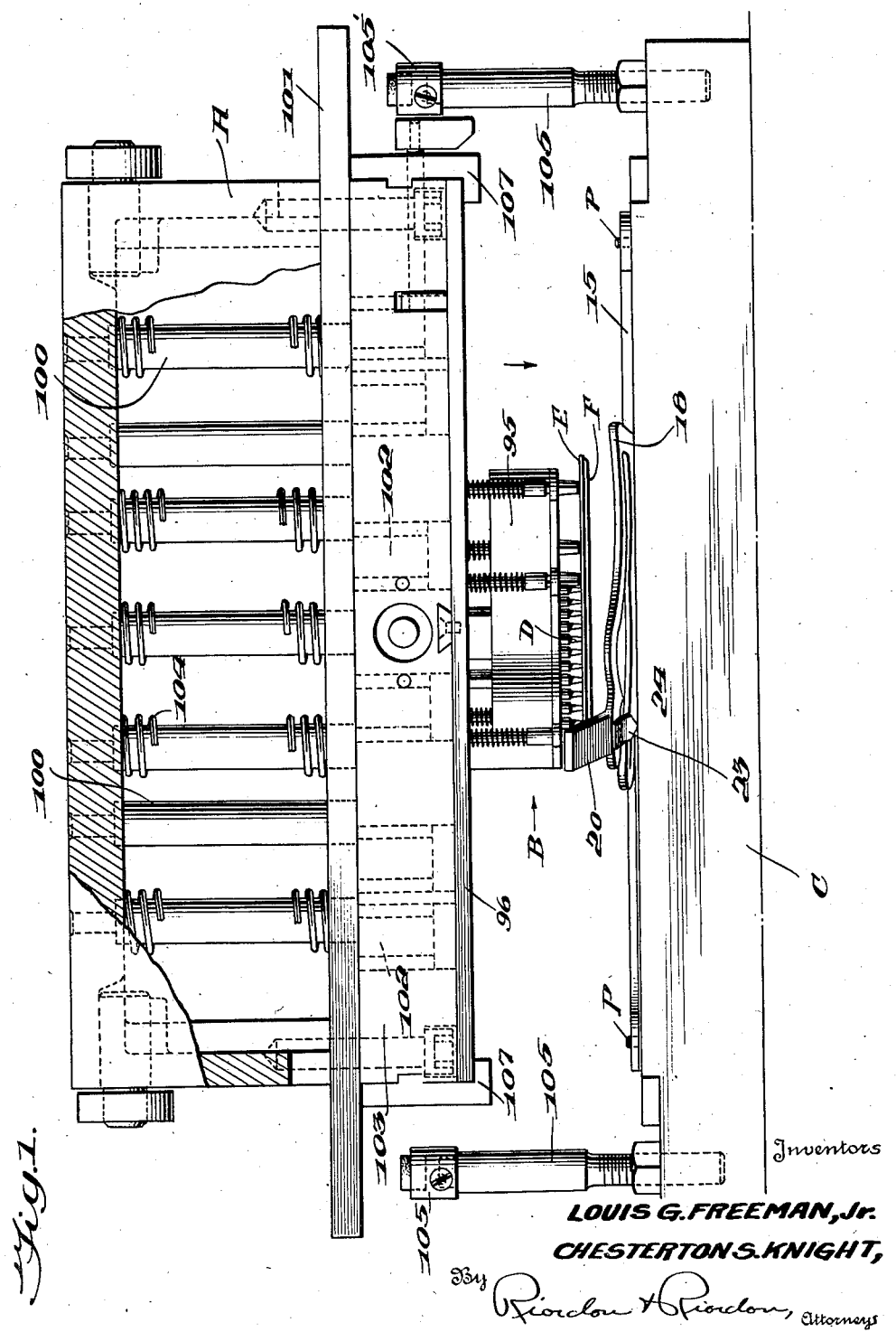

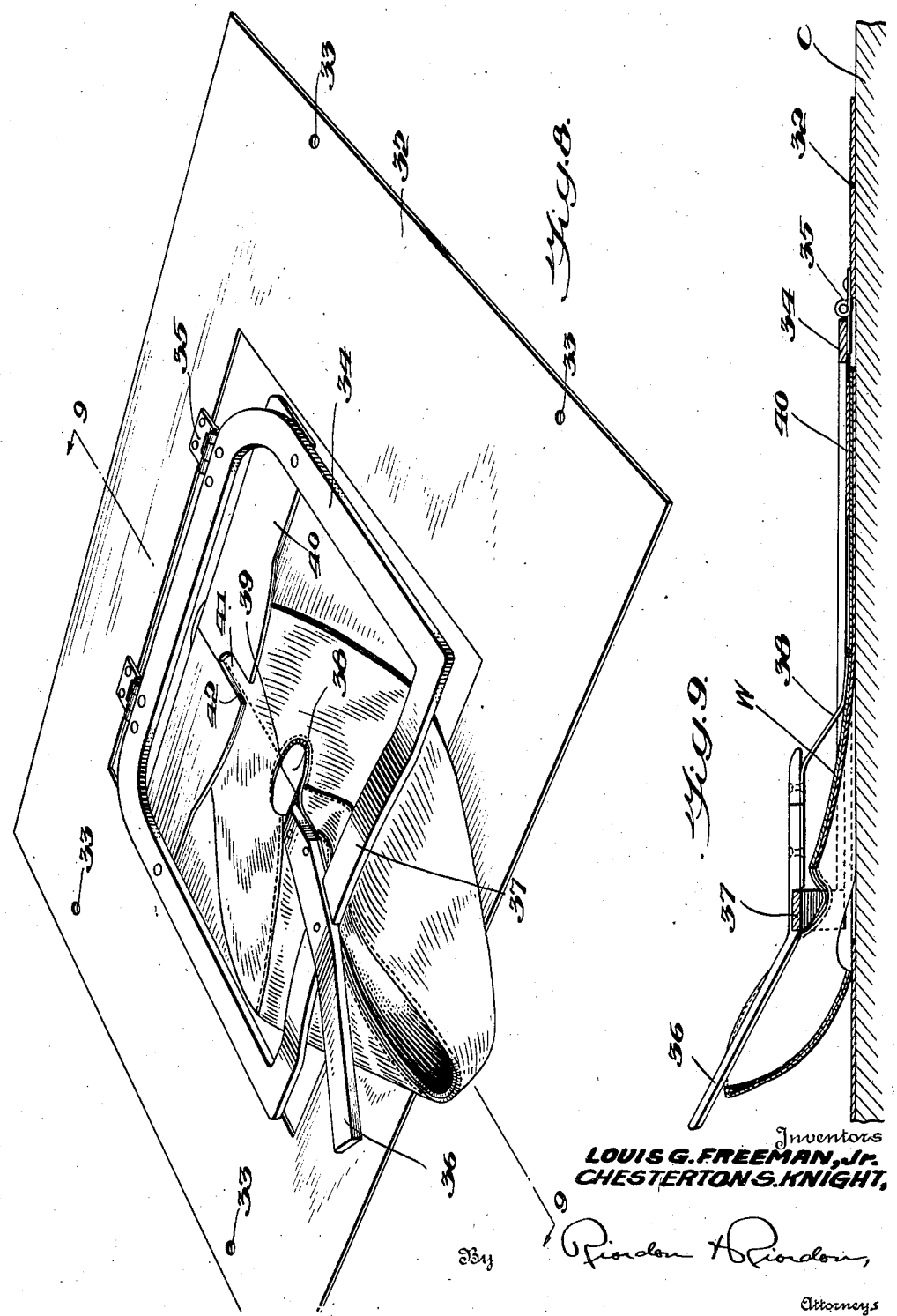

May 16, 1944. L. G. FREEMAN, JR., ET AL 2,348,799
DIE ASSEMBLY
Filed April 18, 1939 11 Sheets-Sheet 5
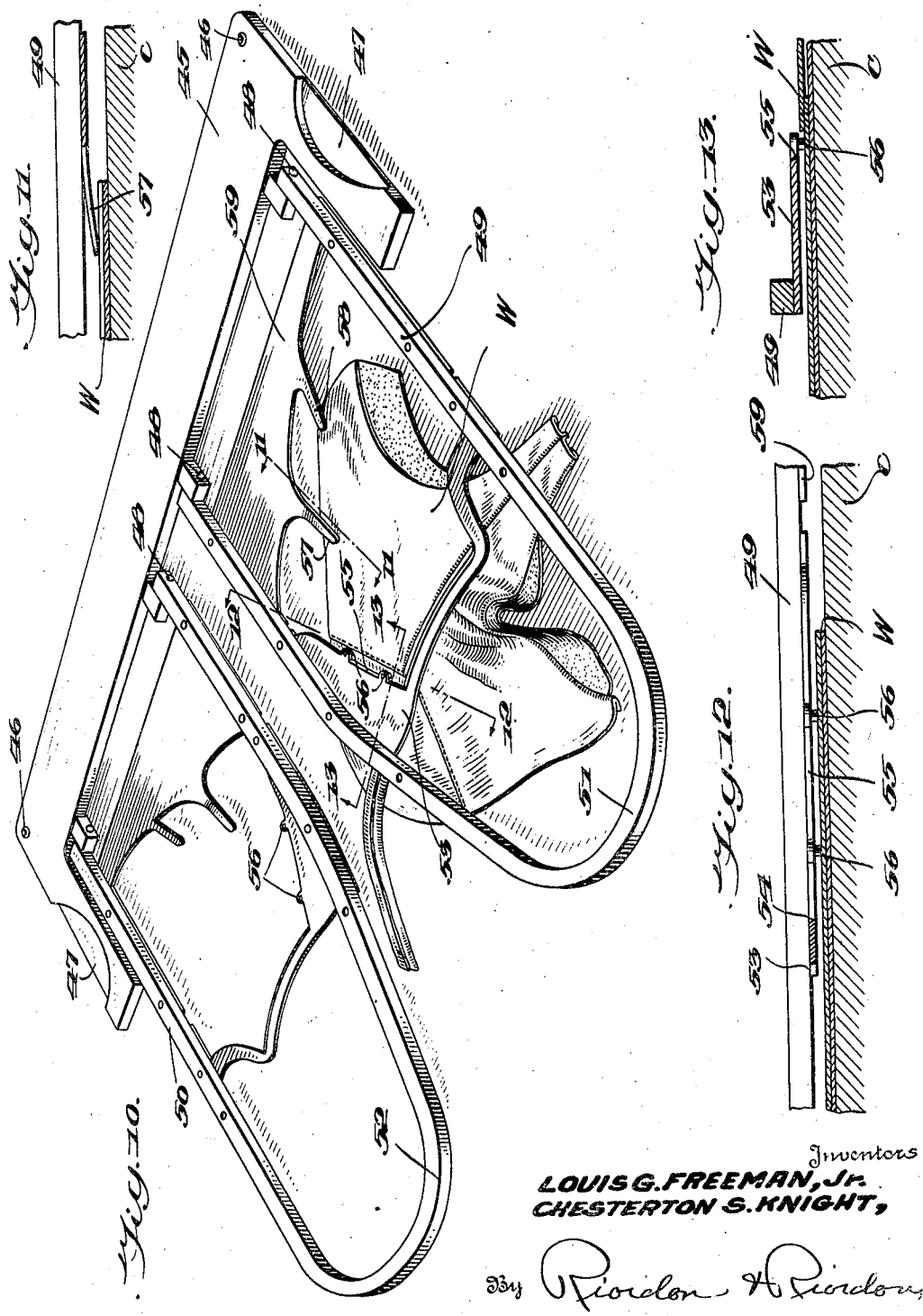
Inventors
LOUIS G. FREEMAN, Jr.
CHESTERTON S. KNIGHT,
By Riordon & Riordon
Attorneys May 16, 1944.   L. G. FREEMAN, JR., ET AL   2,348,799
DIE ASSEMBLY
Filed April 18, 1939    11 Sheets-Sheet 6
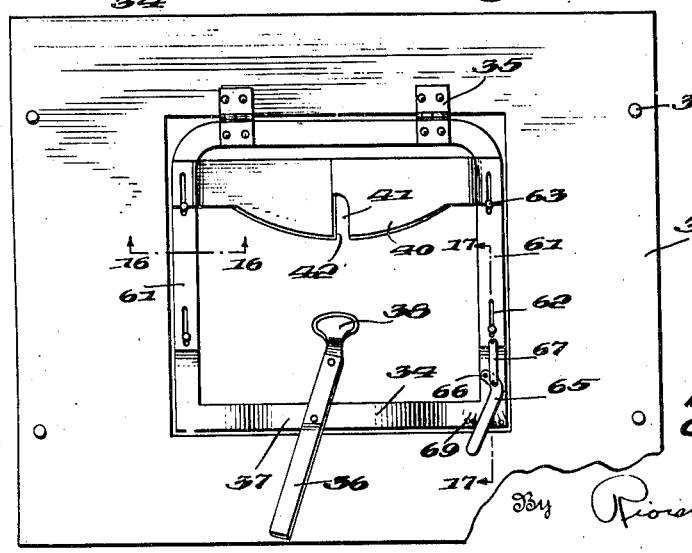
Inventor
LOUIS G. FREEMAN, Jr.
CHESTERTON S. KNIGHT,
By Riordon & Riordon
Attorney

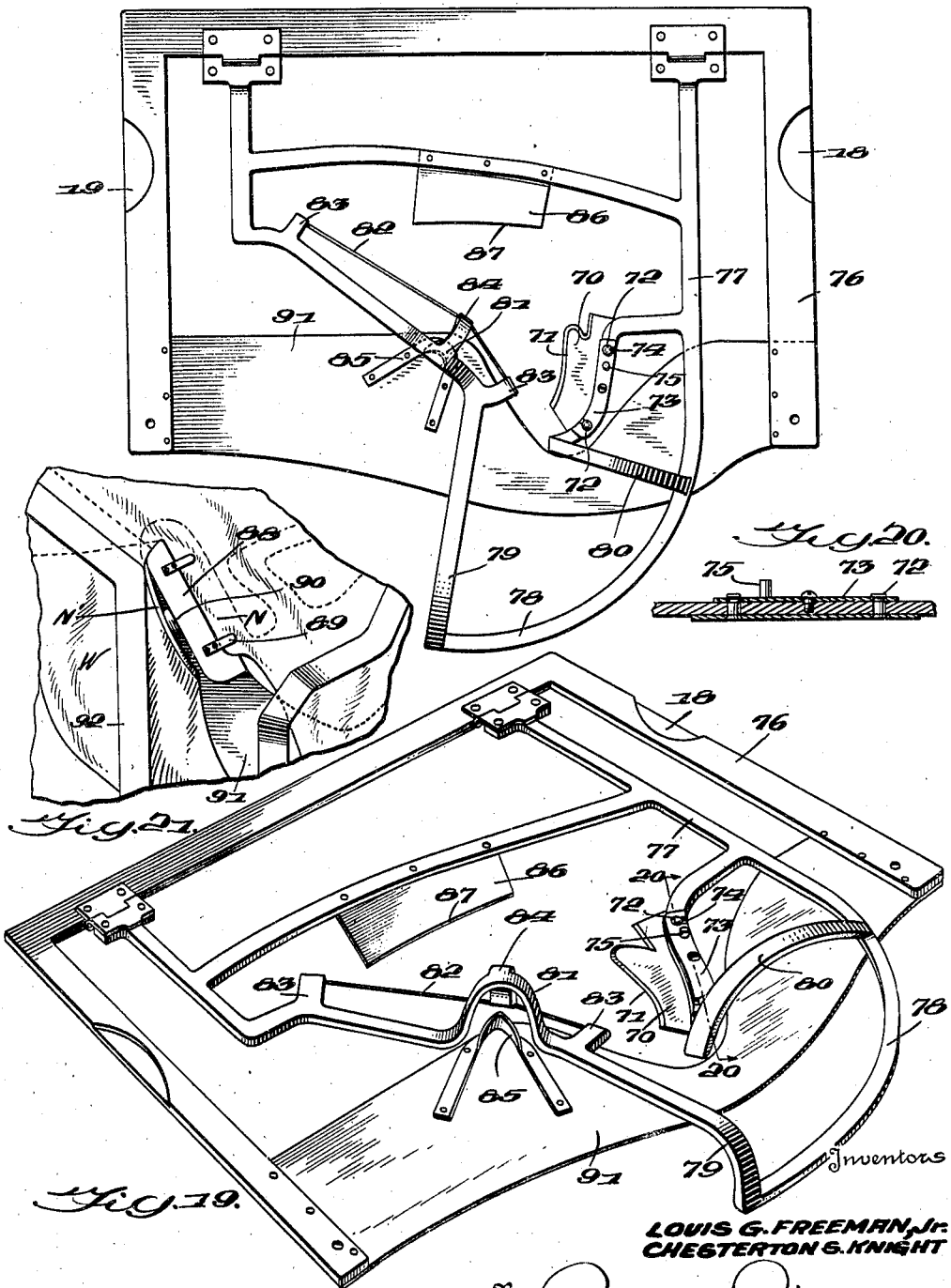

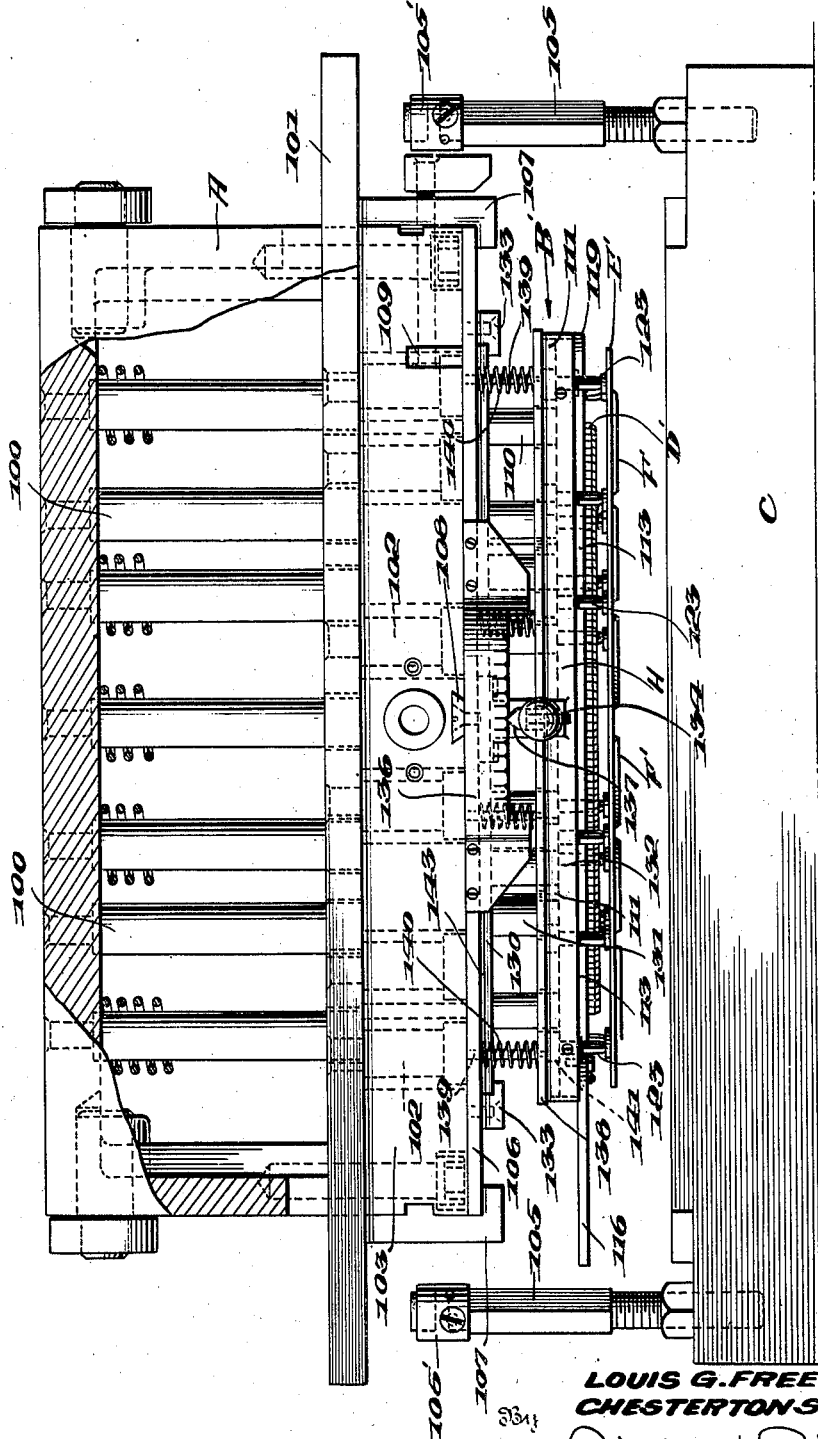

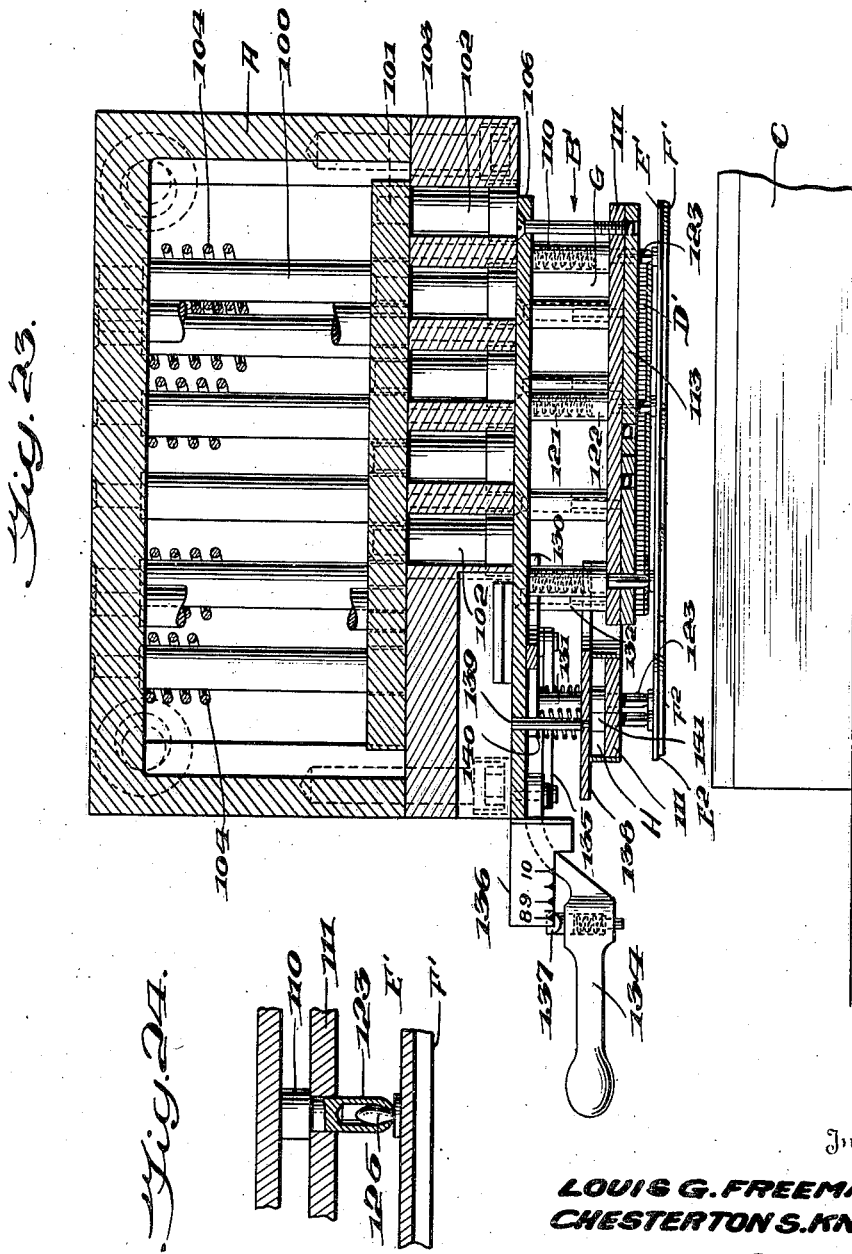

May 16, 1944.  L. G. FREEMAN, JR., ET AL  2,348,799
DIE ASSEMBLY
Filed April 18, 1939  11 Sheets-Sheet 10
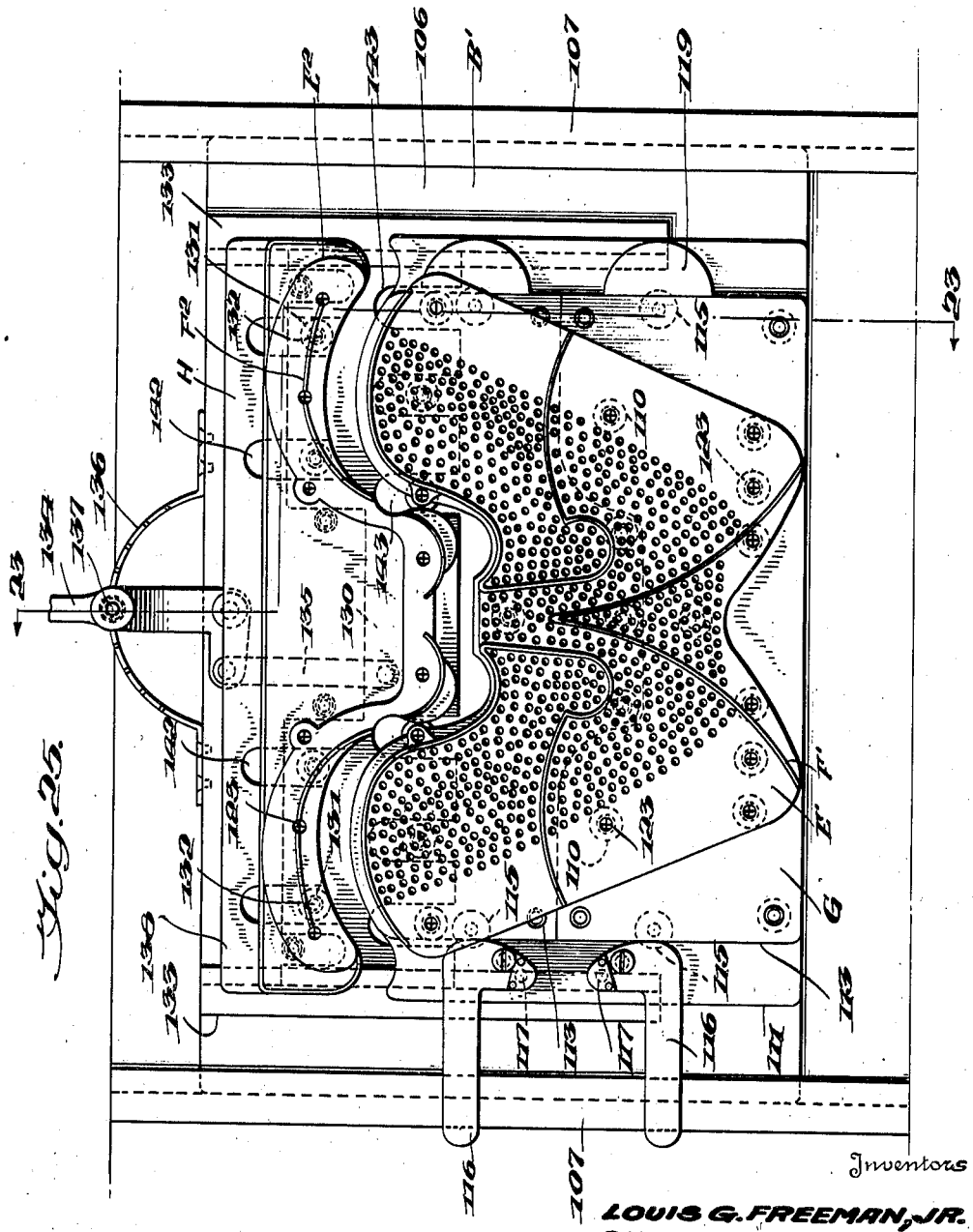
Inventors
LOUIS G. FREEMAN, JR.
CHESTERTON S. KNIGHT,
By Riordan & Riordan
Attorney

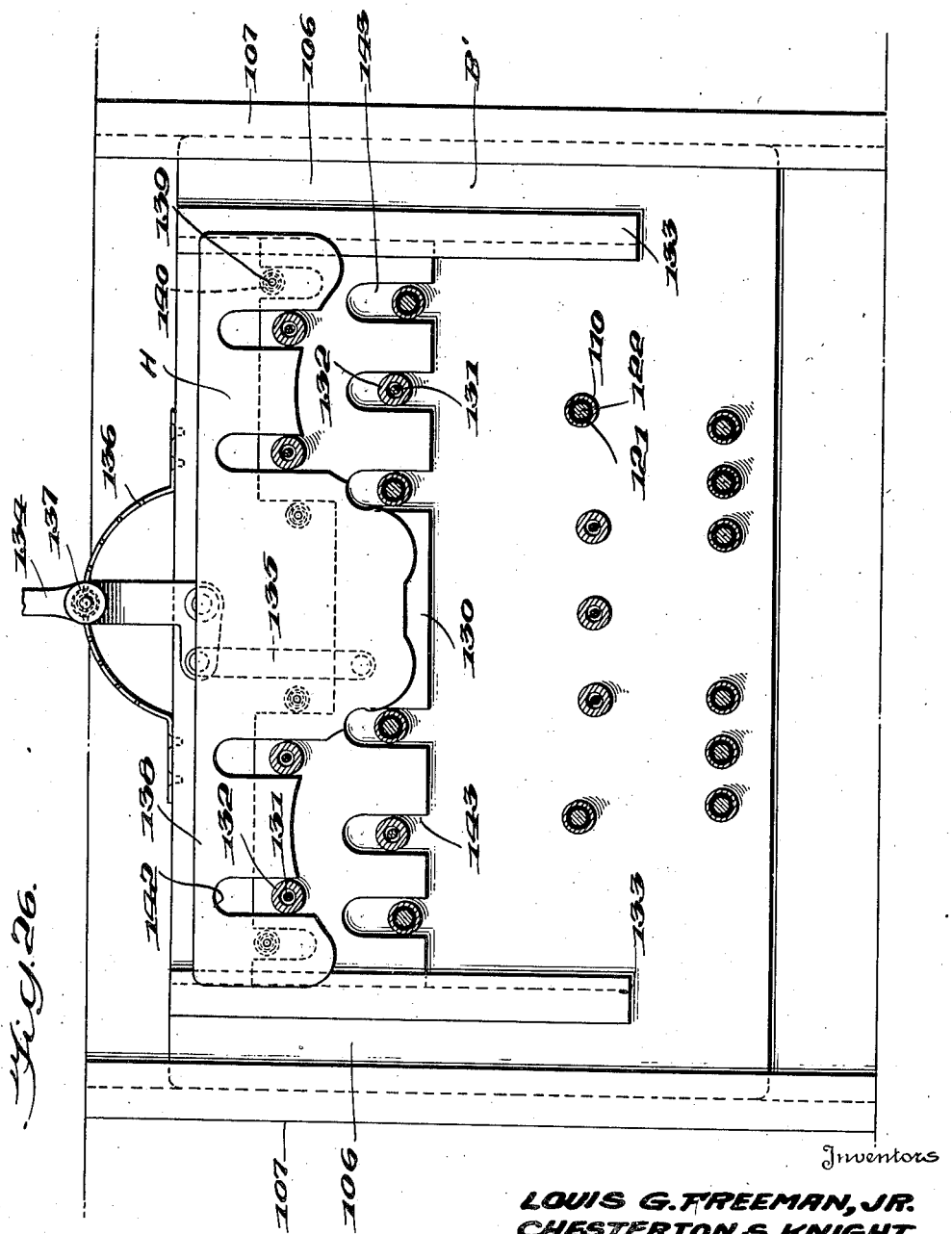

Patented May 16, 1944

2,348,799

UNITED STATES PATENT OFFICE 2,348,799

DIE ASSEMBLY

Louis G. Freeman, Jr., Cincinnati, Ohio, and Chesterton S. Knight, Brockton, Mass., assignors to Benjamin W. Freeman, Cincinnati, Ohio Application April 13, 1939, Serial No. 268,610

29 Claims. (Cl. 101—41)

This invention relates to shoe machinery, and more particularly to improvements in die assemblies for use in ornamenting shoe uppers and shoe parts by the formation of cut-outs or perforations in portions thereof, and also by the application of printed markings in the work.

These die assemblies are generally used in a machine having pressure applying means to provide relative movement between a supported work-piece and the operating elements of the die. Where work that is flat in nature, such as blanks for quarters, vamps, and the like are treated, a flat bed type of die may be used, but when the work is ring-like in nature, as a closed or full fitted upper, or has been shaped out of a flat condition, it has been considered advisable to support the work upon an elevated, anvil structure which provides lateral clearance for draping those parts of the work which are not being treated. Various conditions arise which make it desirable to use machines which are not equipped with anvils, in the treatment of this latter class of work, and other conditions occur wherein, with the use of an anvil, it is advantageous to provide for special handling of the work, and it is one of the objects of the present invention to provide die organizations, including work gauging masks and hold-downs for treating work of other than a flat nature, and at the same time retaining usefulness of the organization for handling flat work.

The illustrated embodiments of the invention disclose types of dies adapted for operations upon skins, upper blanks, fitted and closed uppers, and the like, in which the work is marked with ink or pigment at the same time, or as part of the cycle of operations, during which the work is also ornamented by perforating or cutting out a design or ornamental opening therein. The markings applied to the work may take the form of permanent ornamentation, such as simulated stitching or patterns, or may consist of guide lines to aid in subsequent operations upon the work, e. g. to indicate the location for a line of stitching, or to assist in the fitting together of several shoe parts. Preferably, the marking and perforating or cutting out will be performed in a single machine operation.

Specifically, the invention is directed to improvements in die assemblies including gauge masks and hold-downs for the work, especially adaptable for use in the type of machine described and claimed in the reissue patent of Benjamin W. Freeman, No. Re. 20,294, dated March 16, 1937.

Further, the invention deals with the problem of handling fitted uppers, gypsy seam vamps, full fitted gypsy seam uppers, and other work which by virtue of its peculiar characteristics, has been provided with a "spring," or has been otherwise shaped, and is no longer flat, and will not lie flat in the machine, under normal handling, and which work tends to bunch up or bulge in a manner interfering with operation of the machine, when one portion of the work is made to lie flat for an operation thereon.

In the use of these dies, the work piece is placed upon a suitable support, is aligned with the die by means of suitable gauges, and if not flat, the work is clamped or held with that part of the work to be treated in a flat condition, and properly aligned to the die.

One object of the invention then, is to provide a gauge mask having a portion which holds down and gauges in a single plane, and which portion is restricted to that portion of the upper which can be flattened out.

Another object is to provide room for the operator to hold a bulged out or bunched up portion of the upper continuously during the placement of the work and gauging with the mask, and also to so shape and position the mask structure to force the spring from the portion of the upper to be ornamented and held flatwise to force bunched-up portions of the upper into predetermined positions.

A further object is to provide a structure which will permit the operator to quickly and accurately gauge specialized work, such as gypsy seam vamps, so constructed that the work naturally finds its correct gauging position, instead of fighting against assuming such correct position.

Still another object is to provide in a gauge mask, means for clamping or holding the work in its gauged position during the cycle of machine operation.

The invention also contemplates a gauge mask structure which is made as a frame, rather than solid with an opening therethrough such as in one conventional form of mask, the frame being shaped generally to the outline of the portion of the work to be treated. This permits the operator to see the entire portion of the shoe which is to be masked and died out. At the same time, the frame is made heavy enough to firmly clamp the work in position without bending or springing of the mask, thus eliminating "cripples" caused by slipping of the work after its original placement.

An important feature in one form that the invention may assume is the use of a round, tempered gauge wire shaped to conform to a predetermined characteristic of the work, so attached that the wire is visible to the operator throughout substantially its entire length. Such a wire, being round, will not scratch or mar the work, thus improving that type of mask which is thinned out at its masking or gauging edge, in order that the operator may gauge as close to a seam as possible, and wherein there is always the danger of having a sharp edge to injure the work. The use of a mask or gauging wire which can be fitted to the channel of a seam, insures equi-distant spacing of the ornamenting operation from that seam, on both sides, and aso permits masking the entire length of the seam.

Problems arise in the treatment of shoes having an open throat, whether of the gypsy seam type or not, wherein shoes are to be ornamented for a distance behind the throat and along the nose and top, due to the fact that the opposed edge portions extending from the throat of the vamp tend to overlap each other when the vamp is flattened out for an ornamenting operation. It is accordingly an object to provide means for gauging the throat of such an upper and for aligning the nose and a small portion of the top part along one edge, while at the same time insuring that the opposite edge of the throat from that which is being gauged and ornamented is held out of the way.

In some instances, it may be found desirable to make the mask adjustable, to accommodate a range of sizes and one phase of the invention treats of adjustments in the mask, whereby the locations of related gauging elements of the mask may be varied, and of the provision of mask inserts which are quickly detachable and interchangeable for a range of sizes.

With many types of work the pressure requirements for ornamenting and for stripping are very heavy, and the machine described in said reissue patent is particularly designed to meet such requirements, particularly with relation to the stripping of the work from the die.

Conventional strippers include some mechanism directly associated with the die unit, e. g., a stripper plate mounted on springs which serve normally to maintain the plate in a position slightly in advance of the cutting edges of the die. The spring pressure must be so adjusted as to accommodate varying thicknesses of leather or material upon which the die is working, and difficulties arise in this connection, especially when marking edges are placed on the stripper. Thus if the spring pressure is adjusted to mark and properly strip a light piece of calf skin, it would probably injure a heavy piece of leather. Obviously, when the material is thick the stripper will be depressed more by the material, than would be the case with thin leather.

Varying pressures are required with different characters of leather as well as with different thicknesses, and as the number of cutouts or perforations in a piece of work is increased, the need for greater pressure likewise increases and such pressures are very difficult of attainment, if not impossible, with conventional stripping devices now in use.

In the solution of these problems the machine and dies of said patent, and the dies of the present application contemplate a stripping mechanism wherein the pressure is applied by an arrangement independent of the die, this being accomplished by building a pressure applying mechanism for stripping purposes into the machine, as distinguished from supplying each individual die with a self-contained complete stripping arrangement. The usual stripper plate mounted in advance of the cutting edges, is retained on the die, and this plate may be provided with marking edges thereon.

An important object of the present invention is the provision of a die with a structural design to cooperate with such a "built-in" pressure applying mechanism, and with a stripper plate resiliently mounted for normal location in advance of the cutting edges of the die, but with a mounting of such a nature that little or no pressure will be exerted on the plate, and hence on the work, until the main stripping pressure is applied.

In repairing or replacing cutter members, stripper plates and the like, considerable time and the use of tools is usually required, and it is another object of the present invention to improve the construction of dies, such that the stripper may be rapidly detached from the die without the use of tools.

It is a further object to provide for rapid detachment, not only of the stripper plate but of the cutter or tube plate, thus providing ready access to any part of the structure without the use of tools, at a minimum expenditure of time, and also to facilitate repair and replacement of the cutting members.

To this end a novel mounting for the stripper is utilized, in which resiliently mounted sockets are detachably engaged with studs on the stripper, and are mounted in the base of the die independently of the stripper.

The tube plate is arranged to be firmly latched to the base of the die, but in such a manner as to permit quick release.

A problem arises in the use of these dies, due to the fact that the work varies in size for a given run. Shoe parts are graded in accordance with the desired size of finished shoe, and because of the fact that the die must bear a fixed predetermined relation to the work, it is evident that as the size of the work varies, the relative position of the ornamentation in the work will vary accordingly, unless some means is provided to accommodate the die to the work.

Again the situation might arise wherein it is desired to use the same die on work of different shapes even though the size of shoe might remain constant, and under such circumstances the position of the ornamentation with relation to the work might vary.

Some shoe manufacturers have attempted to overcome these difficulties by employing a plurality of dies, one for an early portion of the run of graded work, and another for a later portion thereof, or one die for one style or shape of work, and a different die for another style workpiece. This, however, places a burden on the manufacturer of keeping a number of dies on hand, with the attendant increase in the cost of the shoe.

Other efforts to properly locate the perforations or cutouts in the work have been attempted by the use of gages which are adjustable to the machine, by equipping dies with adjustable gages and by making the dies themselves adjustable. These various methods may be satisfactory in some instances, where stripping pressures are obtained from within the die itself, and exact positioning of the die in the machine is of small moment, but in the present instance the die must bear a peculiar coordination with the machine in order that the stripping pressures, which are obtained from movable parts of the machine, may be accurately and adequately applied to the proper parts of the die, and if the die is made adjustable, or with any portion shiftable with respect to the die carriage of the machine, there is danger, with conventionally adjustable dies, that the pressure mechanism will not properly function and breakage may result.

It is then, an important object of the present invention to provide a simple means of adjusting a die of the type described in said patent, but in which the adjustment can be effected, and the desired results are obtained without in any manner detracting from the capabilities and advantageous features heretofore mentioned.

To the attainment of the foregoing and other objects which will appear as the description proceeds, reference may be made to the accompanying drawings, in which:

Fig. 1 is a front elevation of one form of die, work support, gauge mask and hold-down in assembled relation;

Fig. 2 is a plan view of one form of mask;

Fig. 3 is a plan view of a different form of mask;

Fig. 4 is a plan view of still another form of mask;

Fig. 5 is an enlarged perspective view of the mask shown in Fig. 2, illustrating its use upon the work;

Fig. 6 is a section on the line 6—6 of Fig. 5;

Fig. 7 is a section on the line 7—7 of Fig. 5;

Fig. 8 is an enlarged perspective view of the mask shown in Fig. 3, illustrating its use upon the work;

Fig. 9 is a section on the line 9—9 of Fig. 8;

Fig. 10 is an enlarged perspective view of the mask shown in Fig. 4, illustrating its use upon the work;

Fig. 11 is a section on the line 11—11 of Fig. 10;

Fig. 12 is a section on the line 12—12 of Fig. 10;

Fig. 13 is a section on the line 13—13 of Fig. 10;

Fig. 14 is a plan view of the mask shown in Fig. 2 and assembled with its die unit;

Fig. 15 is a plan view of a mask similar to that in Fig. 3, but illustrating a modification;

Fig. 16 is a section on the line 16—16 of Fig. 15;

Fig. 17 is a section on the line 17—17 of Fig. 15;

Fig. 18 is a plan view of still a different form of mask;

Fig. 19 is a perspective view thereof;

Fig. 20 is a section on the line 20—20 of Fig. 19;

Fig. 21 is an enlarged plan of a gauge detail showing its application to the work;

Fig. 22 is a front elevation, partly in section, illustrating a different form of die from that of Fig. 1, mounted in the machine.

Fig. 23 is a side elevation partly in section thereof;

Fig. 24 is an enlarged detail, partly in section, showing the mode of detachably mounting the stripper plate on the die;

Fig. 25 is a bottom plan of the adjustable die unit, and

Fig. 26 is a top plan of the block of the adjustable die, illustrating a portion of the pressure applying mechanism in section.

Referring now more particularly to the drawings, in which like reference numerals designate like parts, it will be seen that such parts of the machine as are necessary to show the operation of the die and mask have been illustrated in Figs. 1, 22 and 23.

The die carriage A which houses a mechanism for applying work stripping pressures to the die, carries a die unit B, in operative relation to a work support C. For purposes of illustration, the form of mask and hold-down shown in Fig. 2 has been applied to the machine in Fig. 1, but it will be understood that any other form of mask and die may be likewise applied, depending upon the nature of the work and the pattern of the ornamentation. The die unit B of Fig. 1 is, structurally speaking, non-adjustable, and provided with the usual cutting elements D and the resiliently mounted stripper plate E which may carry marking ribs or projections F. The marking elements F may be omitted if the die is to be used for straight cut-out work, rather than for a combined operation of ink marking and perforating.

The mask shown in Figs. 1, 2, 5, 6 and 7 is particularly adapted to use with full fitted gypsy seam uppers, one of which is shown being gauged, in Fig. 5. It will be noted that the mask consists of two main parts, viz. a stationary frame portion 15 which is attached to the work support C by means of dowel pins P and clamps (not shown) in the same manner that a conventional gauge plate for flat work would be mounted in a machine, openings 16 and recesses 17 being provided to receive the pins and clamps, respectively. This stationary frame portion is so made as to receive a movable gauge framework or mask 18 which is pivoted to the stationary frame by the hinge pins 19, or in any other convenient manner. This movable mask 18 is used for forcing the work W into its correct position with respect to the die, and also for holding the work in this position through the cycle of machine operation. Regardless of the size, strength or weight of the frame portion 15, it will be obvious that the portion 18 can be made of material of sufficient weight and strength to permit of the work W being firmly clamped in position without bending or springing of the mask, thus eliminating inaccurate work.

Further, being made as a frame rather than a solid piece having a gauge opening therein, the operator can see the entire portion of the work to be ornamented which is to be held flatwise by the mask. Desirably also, the frame of the mask 18 will be shaped generally to the outline of that portion of the work which it is to hold down.

The mask 18 is made substantially entirely in one plane, and being made as a frame, can be restricted to that portion of the work which can be flattened out.

The mask is provided with a handle 20 which is elevated into a third dimension, i. e., extended upwardly at an angle from the portion 18, in order to clear any folds or upwardly extending portions of the work W which might project from beneath the mask, as clearly shown in Fig. 5. Similarly, a portion of the mask frame is looped upwardly as by means of a connecting bridge 21, this shaped connection indicates to the operator where to start the bunching up or folding of part of the work preliminary to the action of the movable mask forcing that portion of the work to be ornamented into an aligned flatwise position beneath the mask and forcing the bunched portion into a definite upwardly extending position initially started by the operator. The main flat frame of the mask 18 is discontinued beneath the bridge 21, for the purpose of providing space for a gauging medium which will be fully visible to the operator, and the bridge 21 serves to tie the ends of the mask frame together at this point, giving it rigidity and strength.

Spring fingers 22 and 23 are attached to the bottom of the mask 18, so that when the mask is lowered on to the work, the spring of the fingers will place enough tension on the work to hold it against sliding, and at the same time facilitate proper positioning of the work beneath the mask. That is, with the spring fingers resting lightly on the work as indicated in Fig. 6, the work will be lightly held against free sliding movement, yet will not be held so tightly that an operator will be unable to shift it into proper position. After the work W is correctly masked and gauged, the handle 20 is pressed down to hold the upper tightly, and the spring fingers aid in holding the work firmly in position.

These fingers can be made also to act as a gauge by shaping them to fit an outline or some other characteristic of the work, and as illustrated, the finger 23 is pointed, as at 24 for this purpose. The point 24 will indicate to an operator where the end of the gypsy seam in the vamp throat should be positioned.

The principal gauging means in this form of mask comprises a tempered wire 25 formed and shaped to fit a gypsy seam just as the seam will be when that part of the work to be ornamented is lying flat and held in position by the mask. The ends of the frame portion 18, adjacent the bridge 21 are turned inwardly, and terminate in a plurality of protruding fingers 26 which serve as securing or attaching means for the gauge wire 25, whereupon the major portion of the wire is at all times visible to the operator. The gauge wire 25 will preferably be attached to the under side of the fingers 26, so that when the mask is lowered upon the work, the wire will rest in the channel of the seam, and it will be observed that the wire 25 is given a curvature corresponding to that curvature which the seam of the work will assume when a section or side of the work is flattened for ornamentation.

One method of fastening the gauge wire 25 to the mask is to braze small thin tubes 27 to the under side of the protruding fingers 26. The wire is then slipped through the tubes and formed to exactly fit the seam, and being round will not scratch or mar the work.

When placing the work beneath the mask, the operator starts the bunching of that side of the work opposite to the side to be ornamented, thus curving the seam line, which is the characteristic of the upper by means of which gauging is effected. In some instances such folding or bunching of the upper without control would ordinarily cause the seam line to assume a position running in two straight lines, joined by a curve having a small radius of about ⅜ of an inch, and the portion to be ornamented will not lie truly flat, under such conditions. To remedy and control this situation, the stationary frame 15 is provided with a flattened member 28 terminating in a rounded form or work guide 29, the curvature of the form conforming generally to the curvature of the gauge wire 25 and the proper curvature of the seam in the work. The rounded form 29 is fitted on the gauge close to the gauge wire 25 and thus allows the mask to force the gypsy seam line to follow its true curve. The bunched up portion or fold will extend over the form (Figs. 5 and 7) and will be held against the form 29 by the gauge wire 25, thereupon rounding out the undesirable, comparatively sharp curve of small radius into the true smooth curve of the pattern.

From the foregoing, the use and operation of this form of the invention will be readily apparent. The operator, holding the full fitted gypsy seam upper or work W, will start the fold or bunch in the work, as indicated at the left of Fig. 5, thus tending to flatten out the opposite side of the upper, which opposite side is placed beneath the mask frame 18. The bridge 21 indicates where the break is to come for the bunched portion of the upper. At the same time, where the upper includes a heel end, it is allowed to extend freely toward the operator, and clearance for this part of the work is afforded by the angular disposition of the handle 20, which is so located and positioned on the mask frame 18 that in depressing the handle certain portions of the upper can be firmly held. With the upper in this position, the operator can quickly align and locate the work properly by reference to the point 24 and the seam gauge wire 25, and where necessary to use the form 29 causing a natural assumption of proper curvature in the work.

The masking wire 25 by fitting in the channel of the seam, insures equi-distant spacing of the ornamented section from the seam on both right and left sides of the upper, and the gauging wire, being exposed and of proper length, permits gauging throughout the entire length of the seam. After ornamenting the first side of the upper, the other side may be ornamented such that the design is exactly opposite to the first ornamentation. To ornament both sides of such an upper, a right and a left die are generally required, and to ensure accuracy in the second ornamentation, the second die assembly would preferably have a pin gauge on the stationary portion of the mask to pin to perforations produced by the first die, or the work might be gauged to a mark placed along the seam by the die which is used to produce the first ornamentation, in which event one of the fingers 26 may then be placed so that it acts as a gauge for this mark along the center seam, and such finger may be painted or shaped to identify it as a gauge. In fact, where a finger 26 is used to assist in gauging work, such finger may be positioned to cooperate with any desired predetermined characteristic, whether it be a mark, stitch line, or the like.

With this type of gauge mask and hold-down, it is possible to not only perforate the completely fitted upper through the lining and reinforcement, but it is possible also with the same equipment, to ornament the upper stock only so that an underlayed shoe may be produced. This will be effected by center seaming the vamps, ornamenting and marking them after they have been gauged, and thereafter fitting them to produce an underlayed shoe.

On gypsy seam vamps which do not have excessive toe spring, both sides can be perforated and marked in one operation, by using this type of mask with a straight wire for the center seam the wire rising to a third dimension with the seam as it extends away from the area to be perforated and marked, and those portions of the mask frame which do not engage the work elevated to a third dimension to clear portions of the work, not held flatwise.

On closed or full fitted uppers having an open throat, but not necessarily of the gypsy seam type, it is possible to ornament both sides of the work simultaneously, a gauge of the type just referred to being used per se. The gauging wire 25, together with other details found desirable in gypsy seam uppers may be entirely eliminated. A type of mask for gauging uppers having an open throat is well illustrated in Figs. 3, 8 and 9, and like that of Fig. 2, comprises two main parts including a stationary member 32 which is located on the work support C by the dowel pins P, openings 33 being provided to receive the pin.

A movable gauge framework or mask 34 is suitably pivoted to the stationary member by hinges 35, or in any other suitable manner, and it is this movable mask 34 which is used to align the work relative to the die and to hold the work in aligned position. The structural advantages of weight, strength, shape and size of the mask frame, etc. are all present as in the case of the first described form.

The mask 34, as in the case of the mask 18 is made in one plane, with the gauge parts thereof restricted to that portion of the work which can be flattened out, but with a handle 36 extending at an angle from the mask 34 in order to clear portions of the work which might project from beneath the framework, as clearly shown in Fig. 8.

A portion of the mask frame 34 is curved upwardly at the handle side thereof by means of a bridge 37 to permit the operator to fold and hold that part of the work necessary to quickly align the work beneath the mask, while at the same time permitting the mask to lay flat and hold the work in a flat position. Extending interiorly of the mask, is the mask or gauge finger 38 shaped to the contour of the vamp throat of an upper and the work may be gauged in one or more directions by reference of this mask to the contour of the vamp throat. The gauge 38 may be notched and scored, as indicated at 39, to cooperate with a central seam or other marking on the work, is thought desirable. Preferably, the mask or throat gauge 38 is fastened to the elevated or bridge portion 37 and extended downwardly so as to bring the actual gauging portion thereof into the plane in which the ornamenting operation will be performed on the work. Cooperating with the throat gauge 38 is a tip and center line gauge 40 fastened to the flat portion of the mask frame 34. This gauge is notched, as indicated at 41, to provide a straight edge 42 located to extend along the center line of the work, and this edge will be lined up with the notch and score line 39, thus affording a complete gauging means in all directions. Since the throat gauge 38 is shaped to the contour of the vamp throat and fits within the throat, there will be no tendency for the work to slide. If the shape of the vamp throat be such that the throat gauge would not prevent slippage, then the tip gauge, which is usually made of spring metal, could be projected slightly below the plane of the mask frame 34 for anti-slipping purposes.

When placing the work beneath the mask, the operator folds the rear portion of the work, flattening out the vamp and forepart, this being possible where there is no spring caused by a gypsy seam, or other means and the work then clamped in position with the vamp in flat position and the folded portions of the work extending beneath the bridge 37 and the elevated handle 36.

There are times when it is found desirable to ornament a flat fitted upper having a gypsy seam, that is, with the gypsy seam line stitched and the lining attached, but before vamping, and a gauge mask well adapted to this purpose is illustrated in Figures 10 to 13. The essential features of the invention which are incorporated in the masks of Figures 2 and 3 are likewise incorporated in this form, which comprises a stationary frame portion 45 attached to the work support in the usual manner, openings 46 and recesses 47 being provided to receive the usual pins and clamps respectively. Pivoted to the stationary frame in any desirable manner, as by hinge pins 48 are a pair of movable gauge frames or masks 49 and 50. Since the work with which this form of the invention will be used, is flat fitted, and consists generally of a vamp or incomplete shoe upper, and therefore of relatively small area, it is possible to use a double die, or two separated die units and ornament one side of one vamp and the opposite side of another vamp simultaneously, hence the provision of a pair of gauge masks. The masks 49 and 50 are identical in construction, except that one is a right and the other is a left.

These movable masks are used for aligning the work W, and also for holding the work in aligned position through the cycle of machine operation as heretofore, and the structural advantages set out for the other forms of the invention are all present.

Also it will be observed that being made as a frame the entire portion of the work held down by the mask is visible to the operator at all times. The gauging portions of the mask, likewise, will be shaped generally to the outline of that portion of the work which is being held in a flat condition.

As will be seen the frames 49 and 50 are formed of generally U-shaped configuration, and the loop portions 51 and 52 are extended sufficiently to form handles, and to provide room for the work extending beyond the gauging means. With this construction the entire frame of each mask can be kept in a single plane, and the gauge and holding portions of the mask restricted to that portion of the work which can be flattened out.

Since the masks illustrated are duplicates, it is only necessary to describe the gauging and hold-down portions of one of them. The gauge portion comprises a plate-like member 53 secured to the under side of the frame 49 at opposite sides thereof. Extending between the arms of the frame is a mask or gauge bar 54, the edge of which is shaped to conform to the curvature that the gypsy seam will assume when one side is flattened out and the other side freely extends toward the operator. If the vamp of the work includes the tip or toe portion as an integral part, then an edge 55 of the gauge plate 53 may be shaped to conform to a stitch line or other marking on the work, but if the tip is separate or underlayed, then gauge pins 56 may be projected toward the work, to function as abutment gauges cooperative with the gauging bar 54.

In some instances the edge 55 may be used with the edge of the bar 54 for gauging purposes, and the pins 56 used as pin gauges for insertion into previously formed perforations in the piece of work.

To assist in placement of the work and to insure against slippage, spring fingers 57 and 58, functioning similar to the fingers 22 and 23 described above, may be provided by securing a plate member 59 across the ends of the frame 49 in such a manner that the fingers 57 and 58 project out of the plane of the plate and frame. With some types of work it may be found desirable to shape and position these fingers to function as gauges cooperative with suitable markings or characteristics of the work being treated.

It will be noted then that the entire mask, including gauge surfaces is in a single plane, with the possible exception of the ends of the spring fingers, which however will enter that plane when the work is clamped in position, and the principal gauging means, i. e. the bar 54, functions quite similarly to the gauging wire 25 of the earlier described form, being at all times visible to the operator.

When placing the work beneath the mask, the operator holds that side of the work opposite the side to be ornamented into the space between the gauge bar 54 and the loop handle 51, thus curving the seam line which is the principal part of the upper by means of which gauging is effected.

Where it may be found desirable to make the mask adjustable to accommodate a range of sizes, as in the case where the adjustable type of die, hereinafter described, is utilized, or to vary the location of related gauging elements, suitable means may, of course, be provided for the purpose. As an example, in Figs. 15, 16 and 17, the tip and center line gauge 40 may be made as a slide, movably positioned on top of the mask frame 34. To this end, slide members 61 may be provided, one for each side of the mask frame 34, each member being slotted as at 62 for reception of headed pins 63 projected from the frame 34. The ends of the gauge 40 can then be bent upwardly and over the members 61, and secured thereto at 64, the plane of the mask or gauge 40 remaining in the bottom plane of the frame 34. A crank arm 65 secured to the frame 34 by an offset pivot 66 and connected by a link 67 to one of the members 61 will serve to adjust the assembly of the members 61 and mask 40 to any desired position relative to the throat gauge 38. The arm 65 may be provided with a spring pressed detent 68 on its under side, and the frame 34 with calibrated depressions 69 for the detent, these depressions being calibrated in shoe sizes.

Another mode of handling the problem, either for change of size, shape or characteristic of the work used for gauging or masking, is to provide interchangeable inserts, as illustrated in Figs. 18, 19 and 20. Thus, we have the insert 70 provided with a gauging or masking edge 71. Pins 72 on the insert 70, extend through openings in the mask frame, and serve to attach the insert. A latch 73 is pivoted to the opposite side of the frame, and formed with oppositely disposed notches 74 at its ends to engage beneath the grooved heads of the pins 72, thereby serving to secure the insert 70 in position. A projection 75 may be provided to facilitate pivotal manipulation of the latch, if desired.

The mask frame illustrated in Figs. 18, 19 and 20, while similar in many respects to that illustrated in Figs. 2 and 5, and designed for the same general purposes, is nevertheless somewhat different in construction, to meet exigencies which might occur, and to provide a variation in the mode of handling the work. This mask comprises a stationary frame portion 76 to which is hinged a movable gauge or mask framework 77, shaped generally to the outline of that portion of the work which it is to hold down. The handle of the mask framework, in this instance is extended as a loop 78 in the manner similar to the loops 51 and 52 of Figs. 4 and 10. Portions of the handle, however, are elevated at 79 and 80, in order to clear any extending portions of the work. The mask frame is also looped upwardly or bridged at 81 indicating to the operator where to start the bunching of that part of the work preliminary to the action of the movable mask forcing that portion of the work to be ornamented into an aligned flatwise position beneath the mask and forcing the bunched portion into a definite upwardly extending position initially started by the operator.

A tempered gauge wire 82, secured to the under side of projections or fingers 83 extends past the bridge 81, and like the gauge wire 25, serves to gauge the work by reference to the gypsy seam. In order to insure maintenance of a proper curvature, a projecting arm 84 extends from the bridge 81, and serves as an additional bearing for the wire 82 at the main point of curvature.

Adjacent to the bridge 81 is a form or work rest which has for its prime function the rounding out of the curve assumed by the gypsy seam, just as in the case of the work or work rest 29, previously described. The form 85 also assists the operator in positioning the work with the gypsy seam following its true curve. However, in the instant mask frame the bridge 81 is so proportioned and spaced with respect to the form 85 as to hold the work in its true curve, in effect clamping the work against the form. A gauge wire 82 and the arm 84 likewise assist in thus clamping the work.

Additional masking or gauging members such as the mask plate 86 having a gauging edge 87 may be provided, if the nature of the work requires it.

On shoes having an open throat, and which are to be ornamented for a distance behind the throat, and along the nose and top, the mask may be equipped with a gauge (Fig. 21) extending from the throat backwards to the end of the ornamental design. This may be a narrow, abutment gauge 88 fitted with one or more small finger clips 89 mounted on top of the gauge to permit the operator to quickly place the shoe in its aligned position. As shown in Fig. 21, one nose N of the work W is placed under the finger clips with its edge abutting the gauge. The nose N' on the opposite side of the throat will be held out of the way, in an upright position by means of a finger 90 extending upwardly in the third dimension. The gauge may be secured in position by mounting same on a thin plate in the stationary frame member, such as the plate 91 (Fig. 18), and the finger 90 may be attached to the thin plate 91 or to the mask frame, whichever is most practical for the particular pattern of shoe.

The mask frame is indicated at 92 and it will be observed from the fragmentary view that this frame may be suitably bridged. Masking of the center seam may be effected by a gauging wire, or by mask material, both types of gauging means being illustrated in Fig. 18.

It has been stated above that the dies used with the various masks, are generally conventional in nature. However, with certain masks, e. g. those illustrated in Figs. 2 and 18, wherein there is an elevated, bridge-like portion such as the bridges 21 and 81, the die may be shaped to provide clearance for the bridge and the work bunched under the bridge. The die B shown in Fig. 1 is shown assembled with the mask in Fig. 14, and it will be observed that the wall 93 of the die body is curved or cut away to clear the gauge wire 25, as well as the bridge 21 and the bunched portion of the upper. Walls 94 and 95 may likewise be suitably shaped to clear any portions of the mask or work which might be elevated. The overall height of the die unit B and the stroke of the plunger will be such as to make it unnecessary to alter the conventional base plate 96 by means of which the die is held in position in the machine, this being also true of any die used with the machine.

Again, when the number of cutouts or perforations in a piece of work is increased, and the need for greater pressure likewise increases, with an attendant increase in stripping pressures, provision must be made to care for the increased pressures, and at the same time avoid injury to the work. As stated above, this may be accomplished by building a pressure applying mechanism for stripping purposes into the machine, as distinguished from supplying each individual die with a self-contained, complete stripping arrangement.

Reference to Figs. 1, 22 and 23 will show that the die carriage A which houses the mechanism for applying stripping pressures is in the form of a hollow block, reinforced internally by struts 100, any desired number of which may be utilized. Extending transversely of the interior of the carriage is a pressure plate 101, the ends of which project beyond the sides of the die carriage, the side walls of the carriage being cut away to permit vertical reciprocation of this plate within the carriage. This plate 101 carries a series of studs 102 on its lower side, which ride in suitable guide openings in the heavy base block 103 of the die carriage. Between the upper side of the plate 101 and the top wall of the housing or carriage A are a series of heavy springs 104, which normally are tensioned to maintain the plate 101 in such a position that the ends of the studs 102 are substantially flush with the bottom outer surface of the block 103.

In the illustrated embodiment, the work support C is a vertically movable plunger arranged to position the work upwardly against the die, thus effecting the ornamenting operation on the work. Posts 105 mounted on the work support are located to engage the extending ends of the plate 101 as the plunger work support C rises, thereby raising the plate against the resistance of the springs 104, and at the same time raising the studs 102 within their guides.

Obviously, it is merely a matter of design, whether the work support C rises, or is made fixed, and the die carriage A arranged to reciprocate.

The posts 105 may be adjusted as to height, for the purpose of regulating the movement of the plate 101, this adjustment affording a means of controlling the compression of the springs 104, and hence the pressure applied to the plate 101. The posts may be rubber surfaced, if desired, to minimize shock upon engagement with the plate 101, and may be connected across the ends of the work support C, by rubber surfaced bars 105¹, it being understood that a preferred form will utilize four posts, one for each corner of the plate 101.

When, as stated heretofore, it is desirable to utilize an adjustable die to accommodate a range of sizes or shapes of work, problems arise, particularly due to the use of stripping pressure mechanism which is separate from the die. The die B of Fig. 1 is non-adjustable, and the stripping mechanism in the die will always be positioned in the same location with respect to the pressure mechanism in the die carriage A. But the die B¹, shown in Figs. 22, 23, 25 and 26 offers additional problems which cannot be solved by merely taking a die such as the simple die D and adding a slidable or movable section thereto.

The die unit B¹ in the form illustrated, comprises a base plate 106, by means of which the unit is secured to the base block 103 of the die carriage A, just as in the case of the die shown in Fig. 1. Lugs 107 may be provided to prevent springing of the die when in use, and to facilitate positioning of the die unit on its carriage. A dove-tail wedge 108, and an upstanding perforated lug 109 may be utilized on the plate 106 to co-operate with suitable locking means on the base 103, a preferred form of locking means being described in the reissue patent supra.

The die unit B¹ is composed of two major sections G and H, the section G being mounted in fixed relationship to the plate 106, and the other section H, being mounted for sliding movement on the plate 106, being carried by guides 133. With this arrangement, as will appear, the position of the section H may be varied with respect to the fixed section G. The section G is quite similar to the die unit of Fig. 1, and comprises a die block 111 secured to the base plate 106 by means of struts or sleeves 110. A single, solid block, suitably apertured for the discharge of chips or cuttings from the work, might well be used in lieu of the base plate 106, and the die block 111, but for economy in manufacture, questions of weight and facility of adjusting or varying the height of the die unit, the spaced plates are preferable.

A cutter or tube plate 113 is detachably mounted on the die block 111, suitable guide studs being provided to insure accurate placement thereof. As a convenient mode of attachment the die block 111 may be formed with enlarged openings, and the tube plate 113 provided with overhanging flanges or lips 115—115 at opposite sides, insertable under the edges of such openings. A pivoted latch 116 which is mounted for movement over one of the flanges or lips 115 serves as a convenient means of latching the plate in position, it being understood that the flanges on one edge of the plate are first inserted in the corresponding openings of the die block, and then the latch 116 is swung over the flange 115 at the opposite edge. Any suitable detent, such as indicated at 117, may be used as effective means of holding the latch 116 in position at either end of its pivotal movement. This arrangement may be duplicated where desired, as shown in Fig. 25.

Plate 119 may be provided to partially block the openings for the flanges 115, and to afford a shoulder for the flanges 115 at one side of the block 111, whereupon the flanges may be slid thereunder.

A die block 111 will be suitably perforated beneath the usual tubes or cutting members D¹, which correspond to the tubes D of Fig. 1, to permit discharge of chips and cuttings. The resiliently mounted stripper plate E¹, which may be provided with marking ribs F¹, is necessarily mounted for yielding movement with respect to the cutters D¹, and to this end certain of the struts or sleeves 110 are utilized to house a spring 121, encircling the pin 122 which is freely reciprocable within said sleeve or strut. The die block 111, tube plate 113, and the base plate 106 are perforated to permit reciprocation of the pins.

The outer end of each pin 122 terminates in a resilient socket 123 (Fig. 24), adapted to receive and grip one of the knobs or ball-shaped protuberances 125 on the under side of the stripper-marker plate E¹. It will be evident that the plate E¹ may be quickly removed from the die unit and is easily replaced, yet being carried by the spring mounted pins 122 will readily move with respect to the tubes or cutters D¹. The springs 121 are preferably very light in construction, having sufficient strength only to normally maintain the plate E¹ in advance of the plane of the cutting edges, and to provide a proper printing or marking pressure, when the plate is used for marking purposes, as fully described in Reissue Patent No. 20,294, above mentioned.

The operation of the die unit as thus far described, and this operation is applicable to the die B illustrated in Fig. 1, will be apparent from the foregoing description. When the die unit is secured in operating position on the base 103 of the die carriage, the location of the inner ends of the pins 122 is such that they are opposed to the outer ends of the studs 102, the latter being of much greater cross sectional area than the pins 122, and so distributed throughout the base 103 as to permit wide leeway to the die marker in locating the pins 122.

As the studs 102 move away from the die, due to pressure against the plate 101 under influence of the relative movement between the plate 101, the work supporting plunger C, and the posts 105, clearance will be afforded beneath the heads of the studs 102 for the upper ends of the pins 122 on the stripper plate. It is, of course, understood that the base plate 106 (or 96, Fig. 1) is suitably perforated to permit projection of the studs or pins 122 therethrough and into the clearance which will be afforded beneath the studs 102.

Little or no pressure is required for marking and consequently when there is relative movement between the plunger or work support C and the die carriage A, toward each other, the marking elements F¹ (or F) on the stripper plate E¹ (or E) will touch the work lightly, yielding toward the cutting elements under continued pressure from the work. It will be understood, of course, that when a marking medium, such as ink, is used, it will have been applied to the marking elements F¹ (or F) at a proper point in the cycle of operations.

It will also be obvious from the disclosures herein that the springs 121 are very much lighter than the stripping pressure applying springs 104, the springs 121 being designed primarily to provide merely the requisite pressure for proper printing or marking of the work, without mutilating or otherwise injuring the work.

The marking operation will be followed by the perforating or cutting step as further relative movement occurs, the ends of the pins 122 meanwhile projecting up into the guides for the studs 102. The posts 105 will, by that time, have lifted or pushed the plate 101 against the springs 104, to compress same, and carry the studs 102 away from the base plate 106 (or 96).

After an ornamenting operation has been performed on the work, the plunger or work support C and carriage A separate, whereupon the springs 104 will push the plate 101 and studs 102 toward the die unit and against the projecting ends of the pins 122, thereby pushing the stripper plate E¹ outwardly to remove the work from the cutting elements D¹.

This arrangement works very satisfactorily for a given portion of a run of shoes, but when it is desired to make one die accommodate all sizes of a run (instead of using a die such as B for one size, and a different die for the remainder of the run), it is necessary that some adjustment between the various portions of the die be provided.

Problems arise when adjustments are provided in the die, e. g., no matter how much leeway is afforded the die maker by the relative difference in cross-sectional area between the studs 102 and the pins 122, if one portion of the die is moved with relation to a fixed portion, there is danger that the pins 122 will be moved to a location where they will strike a solid part of the block 103, with resultant breakage. Even if no breakage occurred, unless some steps were taken to care for this problem, unsatisfactory operation might result.

The slidably mounted die section H is, insofar as its structural characteristics for operating on the work are concerned, the same as the section G just described. Thus we find the die block 111, which may or may not have a cutter or tube plate detachably mounted thereon (for purposes of simplicity such plate has been omitted from the present showing) in the same manner as the plate 113. A stripper plate E², preferably provided with marking elements F², is detachably mounted in sockets 123 by the medium of knobs or protuberances 125, all as previously described.

However, the die section H instead of being fixedly mounted on the base plate 106, is mounted for sliding movement thereon, and to this end, a sub-base plate 130 is provided, this plate being rigidly secured to the die block 111 by means of struts illustrated in the present embodiment as sleeves 131 surrounding a screw threaded pin 132. Guides or tracks 133 are mounted upon the main base plate 106, and the sub-base plate 130 is slidable therein.

To actuate the section H in its movement toward and from the section G, there is provided a crank handle 134 pivotally mounted on the base plate 106 and having its offset inner end pivoted to a link 135 which, in turn, is pivoted to the sub-base plate 130. Secured to the outer end of the base plate 106 is an arcuate end piece 136 which may be calibrated in shoe sizes, and notched along its edge to correspond with the calibrations. The crank 134 is provided with a resilient detent or spring pressed pawl 137 co-operative with the notches in the end piece 136. Movement of the crank 134 about the end piece 136 will be effective to push or pull the die section H along the guideways 133, whereupon the proper adjustment may be made between the sections H and G to accommodate the desired range of the work.

To insure accuracy at all times in the application of stripping pressures to the sockets 123 which mount the stripper E² in the unit H, there is provided an intermediate pressure receiving plate 138, which is movable vertically in the frame of the die section H, but fixed against lateral movement, and hence maintained always in a definite relation to the studs 102, no matter how much the main portion of the die section H may slide laterally with respect to the plate 138. This plate 138 carries pins 139, which are similar to the pins 122, and function in the same manner. Since the pins 139 are rigid with the plate 138, they will always be properly positioned laterally with respect to the studs 102 and movable into the clearances afforded by such studs 102 upon movements of the plate 101.

Light springs 140, similar to the springs 121, surround the pins 139, being interposed between the base plate 106 and the intermediate pressure plate 138. The sockets 123 in the unit H terminate in heads 141, positioned to engage the intermediate pressure plate 138 on the opposite side thereof from the springs 140, and the sockets 123 are free to move through the die block 111. The intermediate plate 138 is slotted, as at 142, and the sub-base plate 130 is slotted, as at 143, to permit movement of the die section H with respect to the intermediate pressure plate 138, i. e., the slots are provided to accommodate the struts 131 and pins 132, and the resiliently mounted pins 139.

The operation of this section is as follows. When the work supporting plunger engages the stripper E², pressure thereon will force same toward the cutting elements, and at the same time will force the socket heads 141 against the intermediate pressure plate 138. This will result in the pins 139 being projected into the clearance space beneath the studs 102, as the main pressure plate 101 is raised by the posts 105 on the work support plunger.

As the work supporting plunger C separates from the die unit G—H, the pressure from the plate 101 will of course act through the pins 139 to force the stripper plate E² outwardly from the cutting elements.

This operation will be permitted, due to the fact that the intermediate plate 138 remains in a fixed relation to the block 103 of the die carriage, regardless of the relative position of the die section H with respect to the die section G and the die carriage A.

From the foregoing description, the operation and advantages of the improved die assembly including the gauge mask and hold-down will be readily understood. Having selected the desired pattern, the proper die unit and the proper gauge mask, the assembly will be placed in the machine, and the work positioned in proper alignment, as heretofore described. When so positioned, the work will be draped up around the die, as distinguished from that prior practice where the work drapes down over and about an anvil.

The die construction described permits the use of adjustable dies with a machine having a built-in pressure device, where heretofore the shoe manufacturer was limited to a non-adjustable die. Inasmuch as the die is adjustable, a single unit can be used for a plurality of operations, and the shoe manufacturer is not obliged to stock a large number of individual dies of different sizes. This statement also applies to the adjustability in the gauge mask, of which an example is given in Figs. 15, 16 and 17.

Further, since the means for providing stripping pressures is not required in an individual die, or die section, the die construction is simplified over conventional dies by the elimination of stripper springs, rubber strippers, reduction in the number of stripper posts, and simplification of the various parts. By simplification and reduction in number of the stripper posts, it is possible to locate same at points on the die heretofore thought impractical, due to the small space provided. In fact, many economies in the manufacture and use of dies, masks, and the like, are obtained by the arrangement of this invention.

Marking plates, stripper plates, and other similar elements, can be made in sections corresponding to the work to be cut and marked, and may be provided with a top surface having portions higher at some points than at others, thereby accommodating the machine to laminated work such as appliques, overlays, foxings, saddles, and the like, which in a closed or fully fitted shoe upper, form a surface varying in level. A marking plate may be made in sections, and will adjust itself readily to care for varying levels or thicknesses of the work without exerting greater pressures on high points of the work than on low points, or in other words, the marking will be uniform throughout.

By making the marking plate in sections corresponding to the work, the entire unit, with adjustable sections, even to the gauges and masks with adjustable sections, is in itself simplified.

Again, an even distribution of pressure is obtained, regardless of the particular die used, and tendency toward rocking or tilting of the stripper or marker plate is avoided, thus preventing binding, with attendant failure to strip.

The structure of this invention permits the use of proper, relatively light pressures for marking and printing purposes, together with application of pressure in any desired degree for stripping purposes, in a die unit which is adjustable in nature, thus solving a problem which might seem more simple in the case of a non-adjustable die.

Further, it permits operations on work which heretofore has been usually treated in a series of operations, on individual flat blanks, but which can be now handled after the blanks have been assembled into a closed or fully fitted upper, examples of which have been given heretofore.

It is to be understood that the particular embodiments of the invention as described herein are intended as illustrative rather than limiting, and that many modifications within the scope of the invention may occur to those skilled in the art.

For example, with some styles of work, the gauge wire 25 may be centered and straight, and the frame 18 shaped to accommodate a double die which will ornament both sides of an upper at the same time. In other words, features of the structures shown in Fig. 3 and/or Fig. 4 may be incorporated in the structure shown in Fig. 2; the abutment gauge of Fig. 21, and/or the detachable mask insert of Fig. 18 may be applied to any of the masks; in fact any one of the disclosures may be modified by another; again, the arrangement of the die and its relation to the machine in which it is to be used may be such as to cut and mark upwardly instead of downwardly; the relative movement between the die carriage and the work support may be obtained in any desired manner as by moving a die towards a fixed work support, or moving a work support toward a relatively fixed die; the die may be slid laterally into and out of its operative position, or the work support itself may slide; the gauge mask may be attached to the die unit, and if the die is arranged to cut upwardly, the gauge plate may be formed as a work support.

Further, it is contemplated that the fixed die section G may be omitted entirely, as a situation may occur in which it would be desirable to have but a single die section which could be shifted on the base of the die to vary the position of the operating portion of the die with respect to the work and to the machine.

Nor is it essential that either or both of the stationary and movable portions of the mask be strictly and completely framelike in construction. A bar along the back of the device to which the mask is hinged may suffice for the stationary member and the mask might readily be of platelike nature, or a broken frame.

Further, it is contemplated that the die may be used solely for cutting or solely for marking or for cutting and marking in a single operation. It will also be understood that the exact shape and arrangement of cutting elements will vary with every change in pattern and design of shoe.

It will be further evident that a complete die assembly is intended to include not only the die unit with its cutters, strippers and markers, but also the mask gauging, positioning and supporting elements, the one being used with the other, and the one being varied as the die is varied or replaced.

Having thus described our invention, what we claim as new and desire to secure by Letters Patent of the United States is:

1. In a die assembly adapted to ornament shoe parts of other than a flat nature, in a flat bed press, the combination with an ornamenting die, of gauge means for aligning a work piece to the die comprising a stationary frame, a movable frame pivoted thereto, gauging means carried by said movable frame and conforming to a predetermined characteristic of the work, and means in said movable frame shaped at a predetermined location to accommodate a portion extending upwardly from the flat bed of the work extending outside of that region of the work which is to be ornamented as the gauging means forces the portion of the work to be ornamented into a flatwise position and the extending bunched portion into said predetermined location.

2. In a die assembly adapted to ornament shoe parts of other than a flat nature, in a flat bed press, the combination with an ornamenting die, of gauge means for aligning a work piece to the die comprising a stationary frame, a movable frame pivoted thereto, gauging means carried by said movable frame and conforming to a predetermined characteristic of the work, means in said movable frame to hold that portion of the work to be treated in a flattened condition, and means in said movable frame shaped at a predetermined location to accommodate a bunched portion extending upwardly from the flat bed of the work extending outside of the flattened region of the work.

3. In a die assembly adapted to ornament shoe parts of other than a flat nature, in a flat bed press, the combination with an ornamenting die, of gauge means for aligning a work piece to the die comprising a stationary frame, a movable frame pivoted thereto, gauging means carried by said movable frame and conforming to a predetermined characteristic of the work, means in said movable frame shaped at a predetermined location to accommodate a bunched portion of the work extending upwardly from the flat bed and extending outside of that region of the work which is to be ornamented, and a handle for said movable portion elevated out of the plane of the movable portion to provide clearance for untreated portions of the work.

4. A gauge mask adapted to align a work piece of other than a flat nature, to a die in a flat bed press, comprising a supporting frame, a gauge frame movably attached thereto, and having an operating portion disposed substantially entirely in a single plane, gauging means carried by said portion and disposed in the plane thereof, said gauging means conforming to a predetermined characteristic of the work, and said gauge frame having a shaped portion at a predetermined location extending out of said plane to accommodate an upwardly extending bunched portion of the work extending outside of that region of the work which is to be ornamented.

5. A gauge mask adapted to align a work piece of other than a flat nature, to a die in a flat bed press, comprising a supporting member, a gauge frame movably attached thereto and having an operating portion disposed in a single plane, gauging means carried by said operating portion and disposed in the plane thereof, said gauging means including a wire shaped to the conformation assumed by a characteristic of the work when a portion of the work is flattened to receive an ornamenting operation, and means in said gauge frame to force that portion of the work to be treated into a flattened condition, said frame having shaped means at a predetermined location to accommodate a bunched portion of the work extending beyond the gauging means.

6. A gauge mask adapted to align a work piece of other than a flat nature, to a die in a flat bed press, comprising a supporting member, a gauge frame movably attached thereto and having an operating portion disposed in a single plane, gauging means carried by said operating portion and disposed in the plane thereof, said gauging means including a spring finger extending yieldably out of the plane of the operating portion of the frame to hold that portion of the work to be treated in a flattened condition and against slippage, said finger being shaped to cooperate with a predetermined characteristic of the work for gauging purposes, and said gauge frame being shaped to provide clearance for portions of the work extending beyond the flattened region of the work.

7. A gauge mask adapted to align a work piece of other than a flat nature, to a die in a flat bed press, comprising a supporting member, a gauge frame movably attached thereto and having an operating portion disposed in a single plane, gauging means carried by said operating portion and disposed in the plane thereof, said gauging means including a wire shaped to the conformation assumed by a characteristic of the work when a portion of the work is flattened to receive an ornamenting operation, and a spring finger extending yieldably out of the plane of the operating portion of the frame, and effective to hold that portion of the work to be treated in a flattened condition and against slippage, said finger being shaped to cooperate with a predetermined characteristic of the work, for gauging purposes, and said gauge frame being shaped to provide clearance for portions of the work extending beyond the flattened region of the work.

8. A gauge mask adapted to align a work piece of other than a flat nature, to a die in a flat bed press, comprising a supporting member, a gauge frame movably attached thereto and having an operating portion disposed in a single plane, gauging means carried by said portion and disposed in the plane thereof, said gauging means including a wire shaped to the conformation assumed by a seam in the work when a portion of the work is flattened by said gauging means to receive an ornamenting operation, said wire being positioned out of the plane of the operating portion a distance sufficient to ride in the seam of the work when the work is gauged, said operating portion having an opening adjacent said wire into which is forced a bunched portion of the work as the gauging means flattens the portion of the work to be ornamented.

9. A gauge mask adapted to align a work piece of other than a flat nature, to a die in a flat bed press, comprising a supporting member, a gauge frame movably attached thereto and having an operating portion disposed in a single plane, gauging means carried by said operating portion and disposed in the plane thereof, said gauging means including a wire shaped to the conformation assumed by a characteristic of the work when a portion of the work is flattened to receive an ornamenting operation, and a spring finger extending yieldably out of the plane of the operating portion of the frame, and effective to hold that portion of the work to be treated in a flattened condition and against slippage, said finger being shaped to cooperate with a predetermined characteristic of the work, for gauging purposes, means co-operative with said wire and said frame to insure assumption of a proper conformation by said seam when the work is flattened, and said gauge frame being shaped to provide clearance for portions of the work extending beyond the gauging means.

10. A gauge mask adapted to align a work piece of other than a flat nature, to a die in a flat bed press, comprising a supporting frame, a gauge frame movably attached thereto and having an operating portion disposed in a single plane, gauging means carried by said portion and disposed in the plane thereof, said gauging means including a spring finger extending yieldably out of the plane of the operating portion of the frame, said finger being shaped to the conformation assumed by a characteristic of the work when a portion of the work is flattened to receive an ornamenting operation, and said gauge frame being shaped to provide clearance for portions of the work extending beyond the flattened region of the work.

11. A gauge mask adapted to align a work piece of other than a flat nature, to a die in a flat bed press, comprising a supporting frame, a gauge frame movably attached thereto and having an operating portion disposed in a single plane, gauging means carried by said portion and disposed in the plane thereof, said gauging means including a spring finger extending yieldably out of the plane of the operating portion of the frame, said finger being shaped to the conformation assumed by a characteristic of the work when a portion of the work is flattened to receive an ornamenting operation, and a tip and center gauge mounted on the operating portion of the gauge frame in a location to co-operate with said finger, said gauge frame having means to provide clearance for portions of the work extending beyond the gauging means.

12. A gauge mask adapted to align a work piece of other than a flat nature, to a die in a flat bed press, comprising a supporting frame, a gauge frame movably attached thereto and having an operating portion disposed in a single plane, gauging means carried by said portion and disposed in the plane thereof, said gauging means including a plate section having an edge shaped to the conformation assumed by a characteristic of the work when a portion of the work is flattened by said gauging means to receive an ornamenting operation, and a pin gauge cooperative therewith, said plate section extending across a portion of the gauge frame, and said gauge frame having an opening into which is forced an upwardly extending bunched portion of the work extending beyond the gauging means as the gauging means flattens the portion of the work to be ornamented.

13. A gauge mask adapted to align a work piece of other than a flat nature, to a die in a flat bed press, comprising a supporting frame, a gauge frame movably attached thereto and having an operating portion disposed in a single plane, gauging means carried by said portion and disposed in the plane thereof, said gauging means including a plate section having an edge shaped to the conformation assumed by a characteristic of the work when a portion of the work is flattened to receive an ornamenting operation, and means in said gauge frame to force that portion of the work to be treated into a flattened condition, said plate section extending across a portion of the gauge frame, and said gauge frame having an opening into which is forced an upwardly extending bunched portion of the work extending beyond the gauging means as the said means in said gauge frame flattens the portion of the work to be ornamented.

14. A gauge mask adapted to align a work piece of other than a flat nature, to a die in a flat bed press, comprising a supporting member, a gauge frame movably attached thereto and having an operating portion disposed in a single plane, gauging means carried by said operating portion and disposed in the plane thereof, said gauging means including a spring finger extending yieldably out of the plane of the operating portion of the frame to hold that portion of the work to be treated in a flattened condition and against slippage, said gauge frame being shaped to provide clearance for portions of the work extending beyond the flattened region of the work.

15. A gauge mask adapted to align a work piece of other than a flat nature, to a die in a flat bed press, comprising a supporting member, a gauge frame movably attached thereto and having an operating portion disposed in a single plane, gauging means carried by said operating portion and disposed in the plane thereof, said gauging means including a wire shaped to the conformation assumed by a characteristic of the work when a portion of the work is flattened to receive an ornamenting operation, and a spring finger extending yieldably out of the plane of the operating portion of the frame, and effective to hold that portion of the work to be treated in a flattened condition and against slippage, and said gauge frame being shaped to provide clearance for portions of the work extending beyond the flattened region of the work.

16. A gauge mask adapted to align a work piece of other than a flat nature, to a die in a flat bed press, comprising a supporting frame, a gauge frame movably attached thereto and having an operating portion disposed in a single plane, gauging means carried by said portion and disposed in the plane thereof, said gauging means including a spring finger extending yieldably out of the plane of the operating portion of the frame, said finger being shaped to the conformation assumed by a characteristic of the work when a portion of the work is flattened to receive an ornamenting operation, and a tip gauge mounted on the operating portion of the gauge frame in a location to co-operate with said finger, said gauge frame having means to provide clearance for portions of the work extending beyond the gauging means.

17. A gauge mask adapted to align a work piece of other than a flat nature, to a die in a flat bed press, comprising a supporting frame, a gauge frame movably attached thereto and having an operating portion disposed in a single plane, gauging means carried by said portion and disposed in the plane thereof, said gauging means including a spring finger extending yieldably out of the plane of the operating portion of the frame, said finger being shaped to the conformation assumed by a characteristic of the work when a portion of the work is flattened to receive an ornamenting operation, and a center gauge mounted on the operating portion of the gauge frame in a location to cooperate with said finger, said gauge frame having means to provide clearance for portions of the work extending beyond the gauging means.

18. A gauge mask adapted to align a work piece of other than a flat nature, to a die in a flat bed press, comprising a supporting frame, a gauge frame movably attached thereto and having an operating portion disposed in a single plane, gauging means carried by said portion and disposed in the plane thereof, said gauging means including a spring finger extending yieldably out of the plane of the operating portion of the frame, said finger being shaped to the conformation assumed by a characteristic of the work when a portion of the work is flattened to receive an ornamenting operation, and a gauge member mounted on the operating portion of the gauge frame in a location to co-operate with said finger, means to adjust the relative positions of said gauge member and said spring finger, said gauge frame having means to provide clearance for portions of the work extending beyond the gauging means.

19. A gauge mask adapted to align a work piece of other than a flat nature, to a die in a flat bed press, comprising a supporting frame, a gauge frame movably attached thereto and having an operating portion disposed in a single plane, gauging means carried by said portion and disposed in the plane thereof, said gauging means including a spring finger extending yieldably out of the plane of the operating portion of the frame, said finger being shaped to the conformation assumed by a characteristic of the work when a portion of the work is flattened to receive an ornamenting operation, and a tip and center gauge mounted on the operating portion of the gauge frame in a location to co-operate with said finger, means to adjust the relative positions of said tip and center gauge and said spring finger, said gauge frame having means to provide clearance for portions of the work extending beyond the gauging means.

20. A gauge mask adapted to align a shoe upper of other than a flat nature, to an ornamenting die in a flat bed press, comprising a stationary supporting member, a movable gauge member attached thereto, gauge means in said mask including a gauging element conforming to a nose of the upper, and means to hold the opposite nose of the upper away from the region of operations, and means in said movable member shaped at a predetermined location to accommodate an upwardly extending portion of the work extending beyond the region of operations.

21. A gauge mask adapted to align a shoe upper of other than a flat nature, to an ornamenting die in a flat bed press, comprising a stationary supporting member, a movable gauge member attached thereto, an abutment gauge secured to said stationary supporting member and conforming to the edge of a nose of the upper, means on said movable gauge member to hold said nose in abutting relation to the abutment gauge, and means to hold the opposite nose of the upper away from the region of operations, and means in said movable member to provide clearance for portions of the work extending beyond the region of operations.

22. A gauge mask adapted to align a work piece of other than a flat nature, to a die in a flat bed press comprising a supporting member, a gauge frame movably attached thereto and having an operating position disposed substantially in a single plane, gauging means carried by said portion and disposed in the plane thereof including a wire shaped to the conformation assumed by a seam in the work when a portion of the work is flattened to receive an ornamenting operation, means including a work guide or form co-operating with said wire and said frame adjacent said seam at the opposite side of the work from that which is to be ornamented, to insure assumption of a proper conformation by said seam when the work is flattened, and said gauge frame being shaped to provide clearance for portions of the work extending beyond the gauging means.

23. A gauge mask adapted to align a work piece of other than a flat nature, to a die in a flat bed press comprising a supporting member, a gauge frame movably attached thereto and having an operating portion disposed substantially in a single plane, gauging means carried by said portion and disposed in the plane thereof including a wire shaped to the conformation assumed by a seam in the work when a portion of the work is flattened to receive an ornamenting operation, means including a work guide or form co-operating with said wire and said frame adjacent said seam at the opposite side of the work from that which is to be ornamented, to insure assumption of a proper conformation by said seam when the work is flattened, said gauge frame having an elevated portion shaped to provide clearance for portions of the work extending beyond said gauging means, and so positioned and spaced with respect to said work rest as to clamp the work against the work rest during the ornamenting operation.

24. In a die assembly adapted to ornament shoe parts of other than a flat nature, in a flat bed press, the combination with an ornamenting die, of gauge means for aligning a work piece to the die comprising a stationary frame, a movable frame pivoted thereto, gauging means carried by said movable frame and conforming to a predetermined characteristic of the work, and means in said movable frame shaped at a predetermined location to accommodate an upwardly extending bunched portion of the work extending beyond that region of the work which is to be ornamented as the gauging means forces the portion of the work to be ornamented into a flatwise position and the extending bunched portion into said predetermined location, said die and gauge means being constructed and arranged to cause the bunched portion of the work to extend out of the ornamenting region in a predetermined relationship to the die during the ornamenting operation.

25. A die unit adapted for treatment of work of other than a flat nature, for use in an ornamenting machine of the flat bed type having a sufficiently large member to support a full range of work, comprising a base, constructed and arranged to mount and position the unit in an accurately aligned, operating position in the machine, a plurality of die sections carried by said base, one of said sections being fixedly secured to the base and another of said sections being mounted on said base for sliding movement relative thereto and to said fixed section, whereby said die unit may be adjusted to accommodate a variety of work, and adjustable gauge means conforming to a predetermined characteristic of the work shaped at a definite location to form an opening for an upwardly extending bunched portion of the work extending beyond that region of the work which is to be ornamented.

26. In a die assembly adapted to ornament shoe parts of other than a flat nature, in a flat bed press, the combination with an ornamenting die comprising a base constructed and arranged to mount and position the die in an accurately aligned, operating position in the machine, a plurality of die sections carried by said base, one of said sections being fixedly secured to the base and another of said sections being mounted on said base for sliding movement relative thereto and to said fixed section, whereby the die may be adjusted to accommodate a variety of work, of gauge means for aligning a work piece to the die, comprising a stationary frame, a movable frame pivoted thereto, gauging means carried by said movable frame and conforming to a predetermined characteristic of the work, means in said movable frame extending out of the plane thereof in a predetermined location toward the die to accommodate an upwardly extending bunched portion of the work extending beyond that region of the work which is to be ornamented as the gauging means forces the portion of the work to be ornamented into a flatwise position and the bunched portion into said predetermined location, and said die being shaped to co-operate with and accommodate the means in said frame which extend out of the plane of the frame.

27. In a die assembly adapted to ornament shoe parts of other than a flat nature, in a flat bed press, the combination with an ornamenting die comprising a base constructed and arranged to mount and position the die in operating position, a plurality of die sections carried by said base, one of said sections being fixedly secured to the base and another of said sections being mounted on said base for sliding movement relative thereto and to said fixed section, whereby said die may be adjusted to accommodate a variety of work, of gauge means for aligning a workpiece to the die comprising a stationary frame, a movable frame pivoted thereto, gauging means carried by said movable frame and conforming to a predetermined characteristic of the work, means in said movable frame to force that portion of the work to be treated in a flattened condition, and means in said movable frame shaped at a predetermined location to accommodate an upwardly extending bunched portion of the work extending outside of that region of the work which is to be ornamented as the gauging means flattens that portion of the work to be ornamented.

28. In a die assembly adapted to ornament shoe parts of other than a flat nature, in a flat bed press, the combination with an ornamenting die, of gauge means for aligning a work piece to the die comprising a stationary frame, a movable frame pivoted thereto, gauging means carried by said movable frame and conforming to a predetermined characteristic of the work, and means in said movable frame shaped at a predetermined location to accommodate a portion extending upwardly from the flat bed of the work extending outside of that region of the work which is to be ornamented, as the gauging means forces the portion of the work to be ornamented into a flatwise position and the extending bunched portion into said predetermined location, and means on the stationary frame projecting upwardly into and defining the combination with the operation of the movable frame the contour of the bunched portion aforesaid when the movable frame is in its depressed position.

29. A gauge mask adapted to align a work piece of other than a flat nature, to a die, in a flat bed press, comprising a supporting frame, a gauge frame movably attached thereto, and having an operating portion disposed substantially entirely in a single plane, gauging means carried by said portion and disposed in the plane thereof, said gauging means conforming to a predetermined characteristic of the work, and said gauge frame having a shaped portion at a predetermined location extending out of said plane to accommodate an upwardly extending bunched portion of the work extending outside of that region of the work which is to be ornamented, and a former corresponding generally in contour to said shaped portion located on the supporting frame to engage the work beneath the shaped portion.

LOUIS G. FREEMAN, JR.
CHESTERTON S. KNIGHT.